United States Patent [19]
Andrianos et al.

[11] Patent Number: 5,711,497
[45] Date of Patent: Jan. 27, 1998

[54] CAB SIGNALING APPARATUS AND METHOD

[75] Inventors: Nikos Andrianos; Joseph Profeta, both of Allegheny; Joseph P. Elm, Butler; Theo C. Giras, Allegheny; Christopher S. Detka, Beaver, all of Pa.

[73] Assignee: Union Switch & Signal Inc., Pittsburgh, Pa.

[21] Appl. No.: 573,463

[22] Filed: Dec. 15, 1995

[51] Int. Cl.$^6$ .................................................. B60L 21/00
[52] U.S. Cl. ................... 246/34 B; 246/34 R; 246/63 R; 246/28 F; 246/167 R
[58] Field of Search ..................... 246/8, 34 R, 34 B, 246/34 CT, 62, 63 R, 63 C, 63 A, 28 F, 167 R, 169 R, 175, 180, 194, 196; 340/933, 941

[56] References Cited

U.S. PATENT DOCUMENTS

| | | | |
|---|---|---|---|
| 4,494,717 | 1/1985 | Corrie et al. | 246/28 F |
| 4,742,460 | 5/1988 | Hollands | 246/34 R |
| 4,885,689 | 12/1989 | Kane et al. | 246/167 R |
| 5,358,202 | 10/1994 | Tse et al. | 246/34 R |
| 5,501,416 | 3/1996 | Capan | 246/63 R |
| 5,501,417 | 3/1996 | Capan | 246/63 R |

*Primary Examiner*—S. Joseph Morano
*Attorney, Agent, or Firm*—Buchanan Ingersoll, P.C.

[57] ABSTRACT

The invention provides for a cab signaling apparatus and method for use on board a railway vehicle propelled on a set of spaced rails by a traction motor. The cab signaling apparatus may reduce a noise component within a signal having a primary cab signal component and reduce a cab signal component within a signal having a primary noise component. The cab signaling apparatus may further include an adaptive filter to cancel the noise component within the signal having a primary cab signal component without specialized tuning of the cab signaling apparatus. The cab signaling apparatus may include a false code monitor for identifying a true cab signal code and a track signal monitor for identifying a true cab signal in the presence of noise.

55 Claims, 7 Drawing Sheets

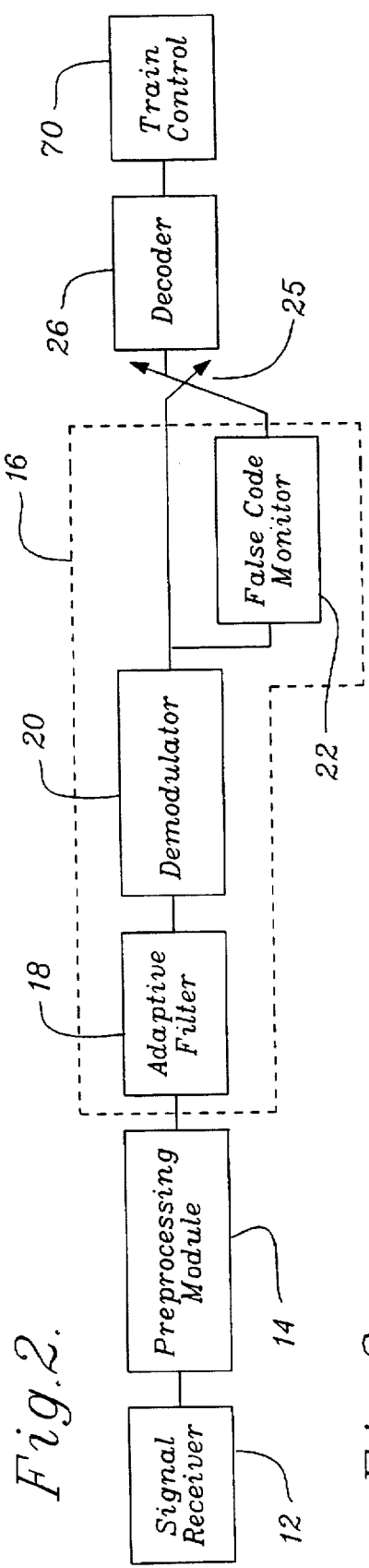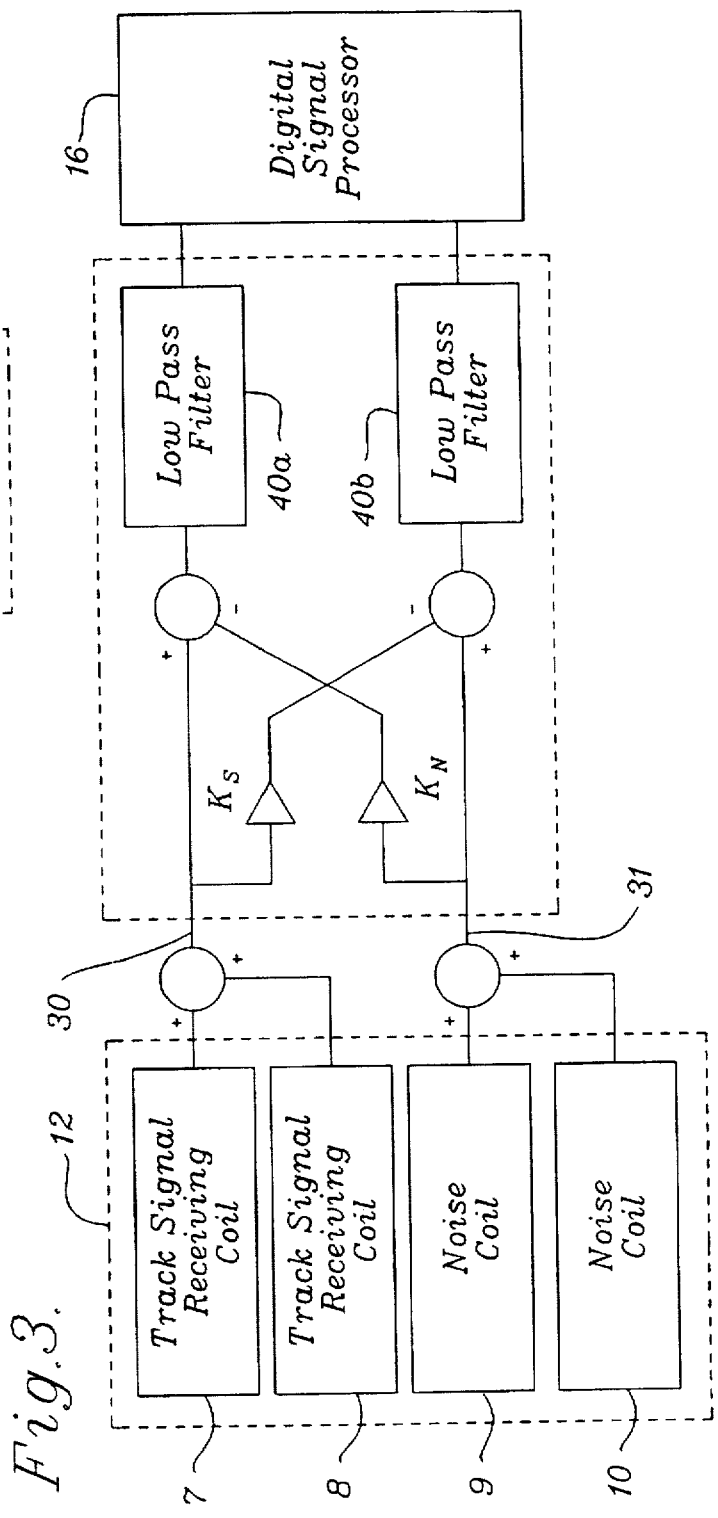

CAB SIGNALING APPARATUS AND METHOD

BACKGROUND OF THE INVENTION

In railway transportation systems it is often desirable to transmit information to a rail vehicle by the use of cab signaling. The information desired to be transmitted is encoded into a track signal current which is transmitted to the vehicle through the rails. When the track signal current reaches the vehicle, the signal information may be detected and the information utilized on board the vehicle.

Some of the information transmitted may be of a nature that is desirable to be known by those on board the vehicle, and/or may be information which is redundant with wayside signaling information. However, in some instances it may be desirable that the cab signaling information transmits track signal aspects, such as speed commands, to the vehicle which is vital to the operation of the vehicle and track conditions which effect the operation of the vehicle. For example, four track signal aspects may be transmitted by the cab signal and each track signal aspect may have an associated maximum speed at which a train may travel into the next block. for example, the four aspects may be "clear", "approach-medium", "approach" and "restricting".

This information can be received by the vehicle through an antenna usually positioned in front of the lead axle which is inductively coupled to the cab signal current which is in the rail in front of the lead axle. The lead axle tends to act as a shunt between the rails and therefore the positioning of the cab signal antenna or inductive coupling is usually done in close proximity to, but in front of the lead axle. Other cab signal pick-up systems may also be utilized.

The inductively coupled pick-up can be an adequate means to receive cab signal information by vehicles which are not powered by frequency varying electric motors. Frequency varying electric drive motors, such as AC propulsion motors used on board locomotives, utilize high current variable frequency electric power. Frequency varying electric drive motors, such as AC locomotive motors, can produce a high level of electromagnetic interference to the cab signal.

Cab signal frequencies of the rail current are usually at frequencies of 60 hertz and 100 hertz, although other frequencies may be used. The AC drive locomotives use variable frequency, variable amplitude control techniques to drive multi-phase traction motors. These propulsion motors draw currents in the order of magnitude of hundreds of amperes. In addition, over the speed range of operation of the locomotive, the frequency range of the propulsion motor current varies over a broad range.

At certain speeds and/or propulsion currents the locomotive motor current will have frequency components that will be close to or equal to the cab signal frequency. Because the locomotive routinely operates over various speed ranges, the interference presented by the AC propulsion current can be expected to be encountered at any time during operation, and often enough so as to present a potential problem to the receipt of AC track signal information.

The present cab signaling frequencies have been utilized for many years and much of the existing equipment operates at those frequency ranges. It would be impractical to change all of the existing cab signal equipment to different frequencies. Similarly, in the AC locomotive propulsion equipment presently utilized, the horsepower and speed ranges demanded by AC traction motors makes the utilization of frequencies between 50 and 100 highly desirable. Therefore, it is desirable to have a system which would permit compatibility between existing cab signaling equipment and present AC propulsion motor vehicle drive.

Cancellation schemes have been constructed to reduce the effect of the interference including electromagnetic interference from the AC traction motors. Such schemes are disclosed in U.S. patent application Ser. No. 08/393,115, filed Feb. 21, 1995, which is incorporated herein by reference.

The incorporated patent applications disclose apparatus and methods to receive cab signal information from the rails and realize that such cab signal has combined with it a certain component which is related to the electromagnetic interference from the alternating current propulsion motor. In addition to receiving the track cab signals, these apparatus sample a signal that is characteristic of the electromagnetic interference which is being subjected to the cab signal pick-up.

The interference component of the cab signal can be removed or substantially reduced by subtracting the sampled signal from the received cab signal. The effect is to cancel the electromagnetic interference component from the sensed track cab signal.

It may be desirable to sample a signal which is characteristic of the electromagnetic interference component but having an opposite polarity. In that instance the sampled signal can be added to the sensed cab signal. The signals will tend to cancel because the polarities of the sensed cab signal and noise signal are of inversed phase.

The apparatus disclosed in the incorporated patent applications may utilize noise sampling devices which include noise pick-up coils positioned relative to the existing cab signal pick-up coils. The noise pick-up coil or coils are positioned on board the locomotive in a location where the noise sampling device "sees" primarily an interference signal and either a low rail current signal or no rail current signal at all. Flux mapping techniques may be used to determine an optimal location for the noise sampling device.

Because the EMI may vary from vehicle to vehicle, and may be difficult to predict due to the varying metallic structures on-board a rail vehicle, the optimum position for the noise sampling device may be found by adjusting the noise sensor position relative to the vehicle, and/or the cab signal sensing unit. Some of the embodiments utilize a structure which permits the coils to be adjusted after they have been mounted on the vehicle.

The optimum position in some applications may be with the noise sensing coil behind the lead axle. Other vehicles may have the optimum position in front of the lead axle generally perpendicular to the cab signal coil. To optimize the positioning or magnitude of the sensed signal in some embodiments it may be desirable to use magnetic shunts between the cores of the respective cab signal sensor and noise sensor. For ease of installation and determining the null at which the noise coils cancel the noise component from the cab signal coil, it is desirable to have the two coils mounted so that they may be adjustable for the angle between the cab signal and noise devices.

The utilization of noise coils in addition to the signal coils provides some cancellation of noise from the track signal. However, some adjusting of the cancellation system on each individual locomotive may be necessary to tune the coils to achieve the desired performance.

In addition, the noise signal is usually scaled before it is subtracted from the received track signal. Specialized tuning of a conventional cab signaling apparatus is usually required when the apparatus is installed on a locomotive to determine the proper scaling factor.

SUMMARY OF THE INVENTION

A cab signaling apparatus for use on board a railway vehicle propelled on a set of spaced rails by a traction motor is provided. The cab signaling apparatus includes a first input device generating a first output signal with a primary cab signal component and a secondary noise component and a second input device generating a second output signal with a secondary cab signal component and a primary noise component.

The cab signal apparatus in accordance with the present invention includes an adaptive filter connected to receive such signals from such first input device and such second input device. The adaptive filter receives such first output signal and such second output signal from the first input device and the second input device. The adaptive filter preferably operates to cancel such secondary noise component from such first output signal without specialized tuning of the cab signal apparatus.

The cab signal apparatus in accordance with the present invention additionally includes a demodulator connected to said adaptive filter. The demodulator receives such first output signal and retrieves a code signal from such primary cab signal component therein. The code signal includes cab signal aspects for assisting with the operation of such railway vehicle.

The cab signal apparatus may include a precancellation module intermediate such first input device, such second input device and said adaptive filter. The precancellation module preferably reduces such secondary noise component within such first output signal and a secondary cab signal component within such second output signal.

The invention provides for a method for reducing noise within a track signal received on board the railway vehicle.

The invention additionally provides for an apparatus and method of identifying false codes within a track signal. A false code monitor may be utilized within the railway vehicle to receive a code signal from a track signal transmitted through a set of spaced rails and identify a false code within such code signal of such track signal. Such false code monitor preferably includes a signal conditioner for modifying such code signal received by such cab signaling apparatus to differentiate such false code from a cab signal code. The false code monitor may additionally include an analyzer to detect a false code within such code signal and an interrupter to discard such code signal in response to the detection of a false code therein.

The invention also provides an apparatus and method for identifying a track signal within a first output signal which includes a cab signal component having the same frequency as the fundamental frequency of a noise component. The apparatus preferably includes a track signal monitor which has a noise detector to monitor such noise component of such first output signal and a track signal generator coupled to such noise detector to create a substitute track signal in response to the frequency of such noise component overlapping such track signal component and the detection of the presence of a cab signal. The track signal monitor additionally includes a phase detector to monitor the phase of a residual signal derived from such first output signal and a logic device coupled to said phase detector to remove such substitute cab signal in response to a change in the phase of such residual signal.

A complete understanding of the invention will be obtained from the following detailed description and the accompanying figures.

BRIEF DESCRIPTION OF THE DRAWINGS

FIG. 2 is a functional block diagram of the cab signaling apparatus in accordance with the present invention.

FIG. 3 is a schematic of an embodiment of the track signal preprocessing module.

DETAILED DESCRIPTION OF THE PREFERRED EMBODIMENTS

Figure 1:
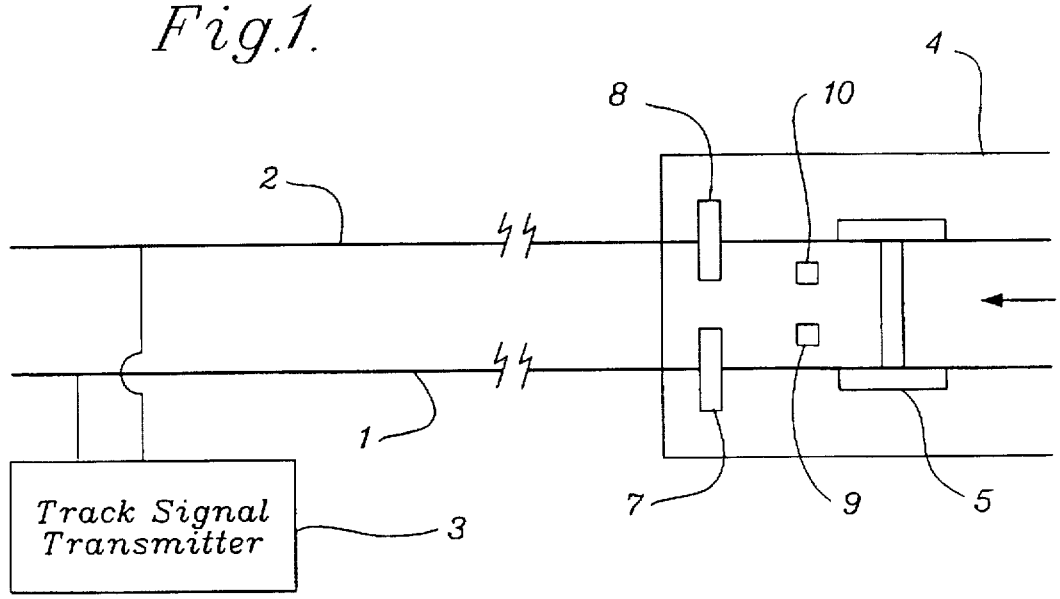
FIG. 1 is a diagrammatic representation of a typical cab signal arrangement.

FIG. 1 shows a typical cab signal system in which a pair of rails 1, 2 form a track which may be utilized to carry a track signal current encoded with information to a railway vehicle positioned on the track. The railway vehicle such as a locomotive 4 is shown moving in a right to left direction and the lead wheel axle assembly 5 is shown.

A track signal transmitter 3 is connected to the rails 1 and 2 to feed a track signal current into the rails 1, 2. The primary circuit path is from the track signal transmitter 3 through rail 1 through the shunt supplied by the wheel and axle assembly 5, and returned to the track signal transmitter via rail 2. This is a typical track circuit scheme in which the vehicle supplies the shunt between adjacent rails.

Usually the majority of track circuit current will go through the lead axle of the vehicle as it advances towards the transmitter 3. Other portions of the track signal current may go through loss paths in the ballast between the rails and a small portion may also go through following wheel and axle assemblies on the vehicle. Therefore, it may be desirable to place a first input device for receiving the track signal in advance of the lead axle, usually 6 to 10 inches above the rail. The track signal from the transmitter 3 is received by the first input device. The first input device may include track signal receiving coils 7, 8.

However, as discussed above, the signal received by the track signal receiving coils 7, 8 may be corrupted (e.g. the track signal may include an electromagnetic interference component especially if an AC traction motor is utilized to drive the locomotive 4). Therefore, a second input device, such as noise coils 9, 10, is also provided on the locomotive 4 as shown in FIG. 1. The noise coils 9, 10 are preferably positioned on the locomotive 4 to receive primarily an interference/noise signal and either a low rail current signal or no rail current at all. Some possible positions of the track signal receiving coils 7, 8 and noise coils 9, 10 are discussed in the incorporated patent application.

A block diagram of an embodiment of the cab signaling apparatus mounted on the locomotive 4 and in accordance with the present invention is shown in FIG. 2. In particular, the track signal receiving coils 7, 8 and noise coils 9, 10 are represented by the signal receiver 12 and as previously stated, the cab signal may be corrupted by a noise component and the noise signal may include a component of the cab signal.

Referring to FIG. 3, a first output signal including a primary cab signal component and a secondary noise signal component and a second output signal including a primary noise component and a secondary cab signal component are preferably forwarded from the signal receiver 12 via lines 30, 31, respectively, to cancellation architecture within the preprocessing module 14 for preliminary analog processing.

The preprocessing module 14 conditions the output signals received by the track signal receiving coils 7, 8 and the noise coils 9, 10. Specifically, the preprocessing module 14 attempts to remove a cab signal component from the second output signal and a noise component imposed upon the first output signal.

One embodiment of the preprocessing module 14 is shown in FIG. 3. The preprocessing module 14 preferably performs three functions. First, subtracting some multiple $K_n$ of the noise from the cab signal results in a new cab signal reference with a significantly reduced amount of interference. This cancellation of a noise component from the signal received by the track signal receiving coils 7, 8 enables the apparatus in accordance with the present invention to utilize an adaptive filter 18 with a slower learning rate than that which would be required if no preprocessing were present. Additional apparatus and methods of canceling noise from the cab signal are disclosed in the incorporated patent application.

The second function of the preprocessing module 14 is to reduce cross coupling of the cab signal component within the noise coils 9, 10. A fundamental assumption in the utilization of an adaptive filter 18 is that the noise reference contains no cab signal. However, the noise coils 9, 10 receive cab signals at a fraction (e.g. 30%) of the level of the track signal receiving coils 7, 8. As shown in FIG. 3, the signal from the track signal receiving coils 7, 8 may be multiplied or scaled by some multiple $K_s$ (e.g. 0.3) and subsequently subtracted from the signal received by the noise coils 9, 10. As a result, a noise reference is generated which is largely free of the cab signal component.

A third function of the preprocessing module 14 is to limit the band of the track signal and reference noise signal through low pass filters 40a, 40b. Band limiting is used when sampling digital data to avoid aliasing frequencies originally above the Nyquest rate. Subsequent processing may be carried out on a digital signal processing board (such as, for example, a SBC31 digital signal processing board by Innovative Integration of Westlake Village, Calif.).

As shown in FIG. 3, the cab signal (first output signal) and noise signal (second output signal) are forwarded to a digital signal processor 16. The digital signal processor 16 preferably includes an adaptive filter 18, demodulator 20, false code monitor 22 and a track signal monitor 80.

Figure 4:
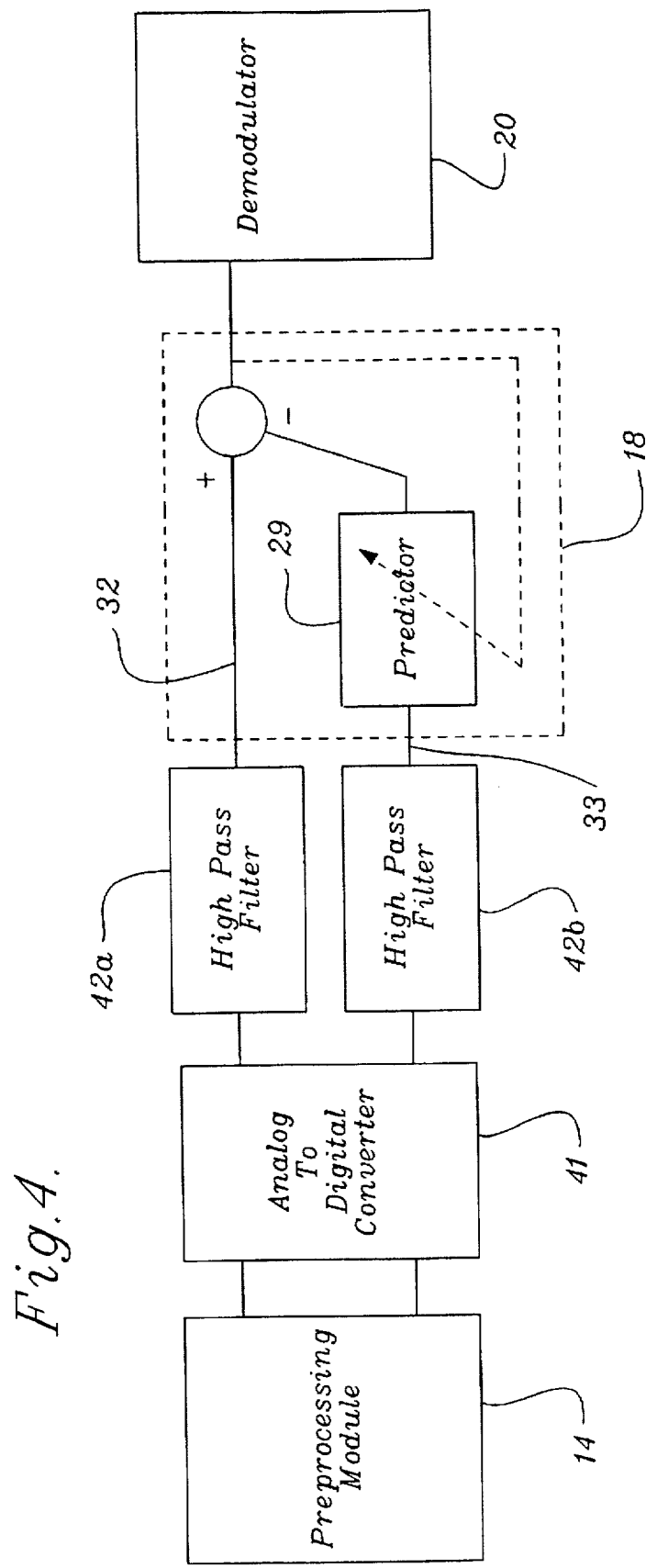
FIG. 4 is a functional block diagram of the adaptive filter interposed between the preprocessing module and the demodulator.

The adaptive filter 18 is shown in FIG. 4. The received cab signal and noise signal may be digitized in an analog to digital converter 41 and applied to high pass filters 42a, 42b prior to application to the adaptive filter 18. The first stage high pass filters 42a, 42b may be first order auto regressive-moving average digital filters intended to remove any DC level in the cab signal or the noise reference. The adaptive filter 18 utilized within the cab signal apparatus may be selected from known filters, including Recursire Least Squares filters and Least Mean Squares filters.

The adaptive filter 18 may receive a corrupted information signal (e.g. first output signal including a primary cab signal component and secondary noise signal component) via line 32 from the high pass filter 42a and the signal which corrupts the information signal (e.g. second output signal including a primary noise signal and secondary cab signal) via line 33 from high pass filter 42b. The adaptive filter 18 attempts to remove noise from the information signal.

Utilizing an adaptive filter 18 provides a robust cab signaling apparatus inasmuch as it eliminates the need to specifically tune the apparatus installed on each locomotive 4 to determine the particular scaling factor $K_n$ for proper cancellation of the noise from the information signal.

In particular, the adaptive filter 18 receives the signals from the track signal receiving coils 7, 8 and the noise coils 9, 10. A predictor 29 within the adaptive filter 18 estimates the noise component within the corrupted signal received via line 32. The output of the predictor 29 is subtracted from the corrupted signal within the adaptive filter 18. The adaptive filter 18 decides how to remove the noise from the cab signal at a plurality of iterations by continuously varying its spectrum characteristic to cancel the noise component generated by such railway vehicle. Therefore, the cab signaling apparatus in accordance with the present invention is self tuning to the railway vehicle on which it is mounted and no specialized tuning is required.

Figure 5A:
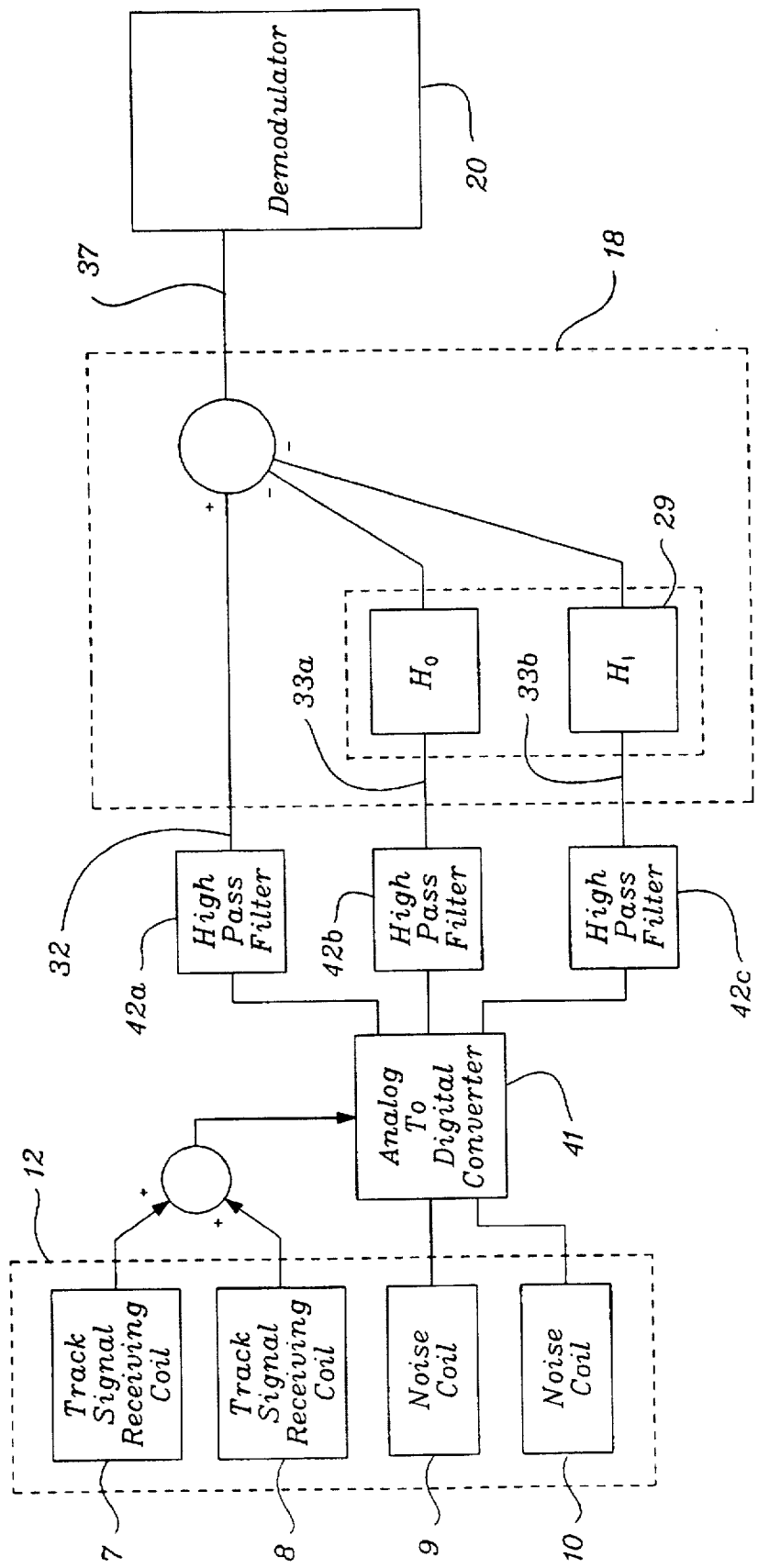
FIG. 5a is a functional block diagram of a direct form Recursive Least Squares adaptive filter.
Figure 5B:
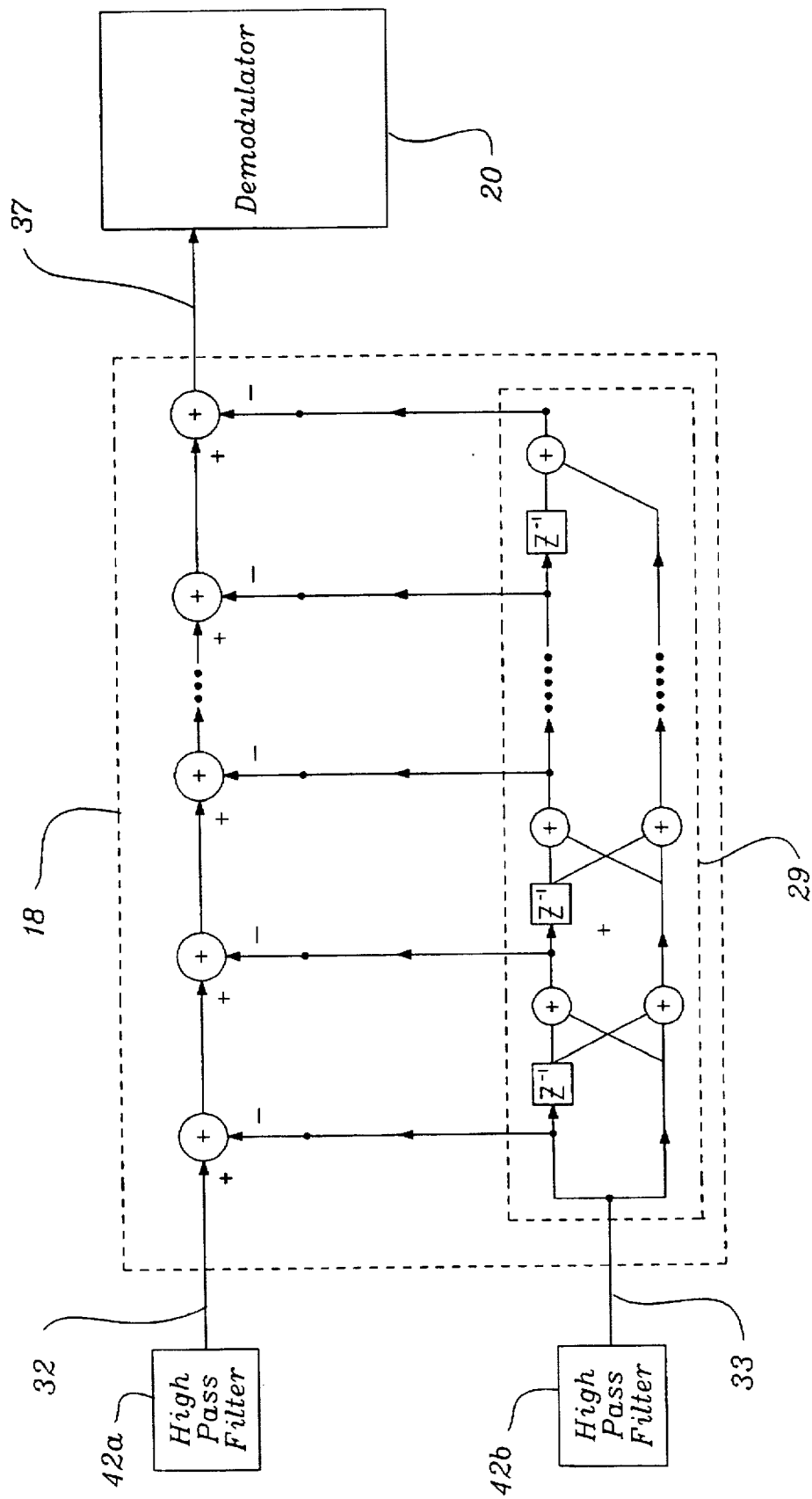
FIG. 5b is a schematic of an adaptive lattice-ladder filter.

The adaptive filter 18 may either be a direct form filter as shown in FIG. 5a or a lattice filter as shown in FIG. 5b. Referring to FIG. 5a, the direct form filter may be utilized if multiple noise channels are present. Using multiple noise references has the potential of enhancing cancellation if each noise reference carries distinct information about the specific noise corrupting the cab signal.

As shown in FIG. 5a, the output from the track signal receiving coils 7, 8 may be combined and applied to the analog to digital converter 41. The digitized corrupted information signal may be filtered in high pass filter 42a and applied via line 32 to the adaptive filter 18.

The output from each noise coil 9, 10 may be individually digitized within the analog to digital converter 41 and applied to high pass filters 42b, 42c. The filtered noise coil signals are applied to the predictor 29 within the adaptive filter 18 via lines 33a, 33b. The adaptive filter 18 attempts to remove any noise within the corrupted information signal by subtracting the output of the predictor 29 therefrom. A residual signal is produced by the adaptive filter 18 and may be applied to the demodulator 20 via line 37.

Alternatively, the lattice filter shown in FIG. 5b may be utilized if a precancellation module 14 has been implemented to provide a single noise reference signal from the noise coils 9, 10. The lattice filter is a computationally efficient realization of an adaptive filter 18 that is more stable in the face of finite precision arithmetic. A residual signal generated by the adaptive filter 18 may be applied to the demodulator 20 via line 37.

A detailed description of the adaptive filter algorithms may be found in J. G. Proakis and D. G. Manolakis, *Introduction to Digital Signal Processing* (McMillan Publishing 1988), incorporated herein by reference.

The residual signal of the adaptive filter 18 is the closest approximation of the original signal from the cab signal transmitter 3. The residual signal may be applied to the demodulator 20 via line 37.

One embodiment of the adaptive filter 18 may have a sampling rate of 1200 Hz and a RLS filter order of 15. In addition, the initial inverse covariance may be 0.01, the forgetting factor may be 1.0 and the reset interval may be 2.358 seconds.

Figure 6:
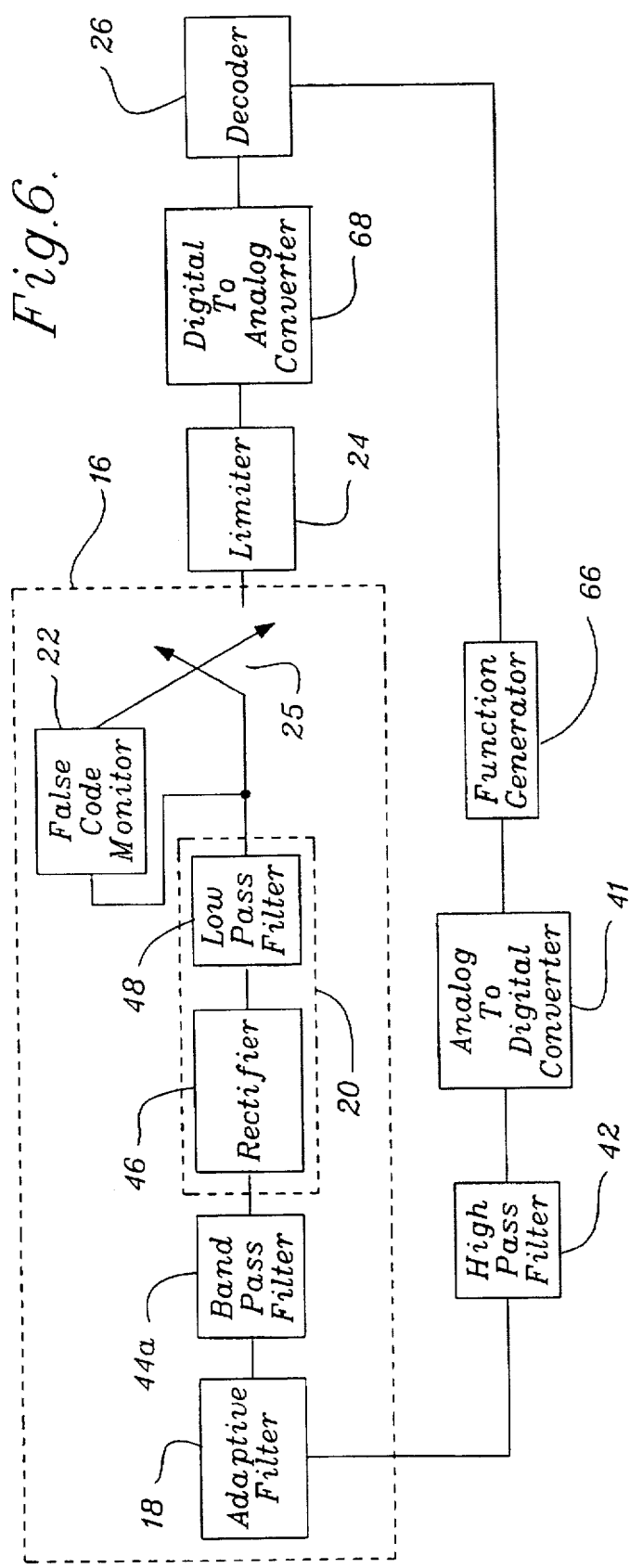
FIG. 6 is a functional block diagram of the digital signal processor of the cab signaling apparatus.

The demodulator 20 is shown in FIG. 6. The residual signal applied to the demodulator 20 via line 37 may include a cab signal modulated by one of a plurality of carriers (e.g. 60 Hz or 100 Hz). The cab signaling apparatus in accordance with the present invention may preferably demodulate the carriers simultaneously in parallel (only one channel is shown in FIG. 6). For example, the band pass filter 44a shown in FIG. 6 may pass a signal modulated by a first carrier (e.g. 60 Hz) and the band pass filter 44b shown in FIG. 8 may pass a signal modulated by a second carrier (e.g. 100 Hz) for simultaneous processing by the cab signaling apparatus.

Figure 8:
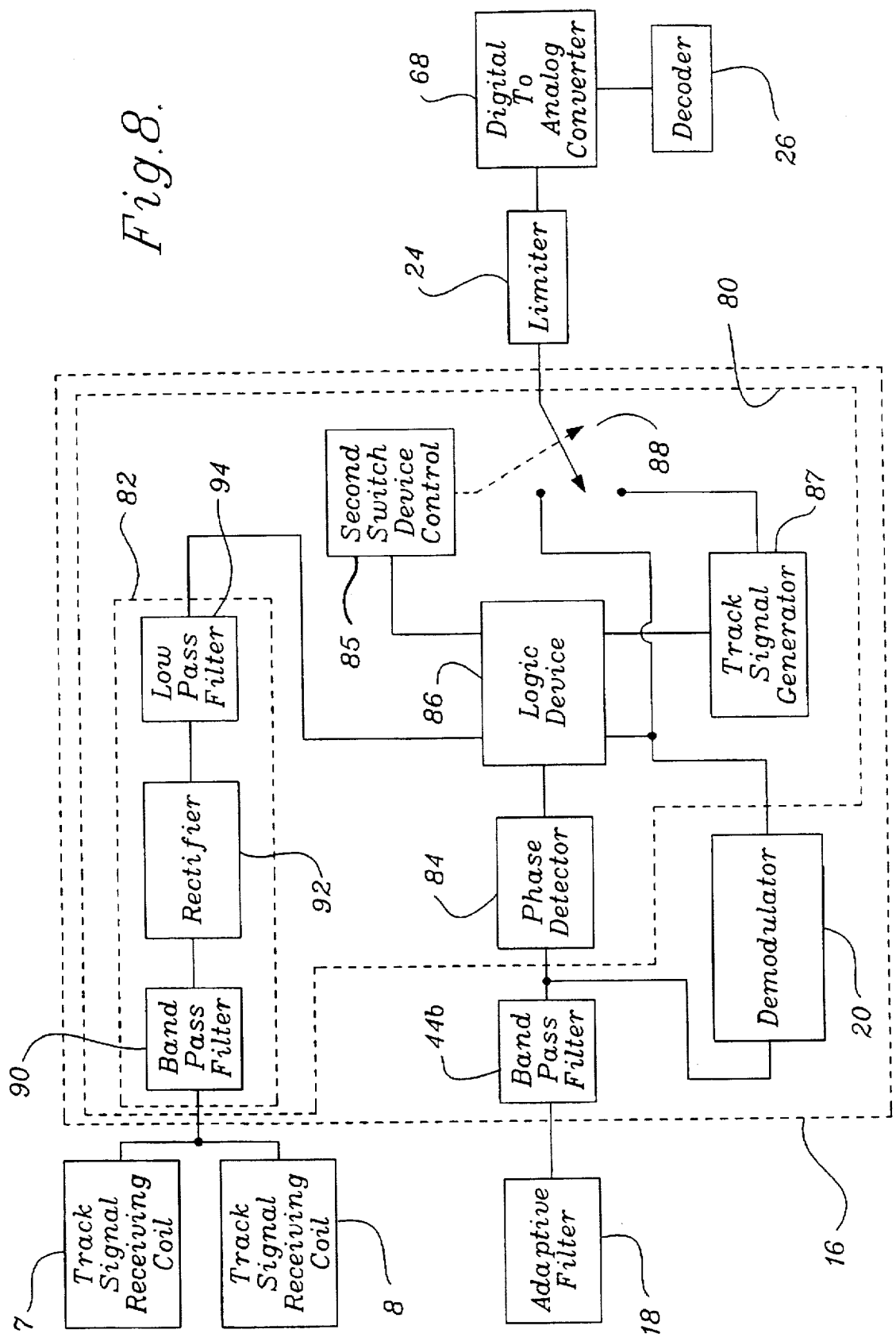
FIG. 8 is a functional block diagram of the track signal monitor of the cab signaling apparatus.

In particular, the residual signal may be applied to a plurality of bandpass filters 44a, 44b, as shown in FIG. 6 and FIG. 8, if more than one carrier frequency may be utilized. The bandpass filters 44a, 44b are digital finite impulse response filters with 200 taps selected because of the linear phase property. The spectrum of the residual signal is limited by the bandpass filters 44a, 44b to the band which corresponds to the respective carrier frequency (e.g. 60 Hz or 100 Hz) of the cab signal.

The band filtered residual signal may be subsequently applied to demodulator 20 which may include rectifiers 46 and low-pass filters 48. The rectifiers 46 and low-pass filters 48 implement standard envelope detection demodulation of an amplitude modulated cab signal.

The demodulated residual signal or code signal may be forwarded to the false code monitor 22. A false code monitor 22 may be utilized within the cab signal apparatus to provide additional protection from false code conditions within the code signal.

False signals and codes may arise when an ambient of the carrier frequency (e.g. 60 Hz from the power line coupling) is combined with AC motor noise whose fundamental frequency is approximately equal to the carrier frequency (e.g. 57 Hz, 58 Hz, 61.25 Hz, 62 Hz, 63 Hz). In particular, the given signals may add constructively and destructively to form a coded carrier whose envelope can be interpreted as a false aspect by the decoder 26 when any of these conditions occur in a segment of track having zero cab signal.

The false code monitor 22 can identify a false code and prevent the cab signaling apparatus from passing a false signal to the decoder 26. For example, the true cab signal code and false code may be different waveforms. In particular, the modulated envelope may be a square wave for a true cab signal code and a sine wave for a false code. Accordingly, in such an example, the difference can be most notably observed in the derivative of the modulated envelope because the derivative of a square wave generally has a larger magnitude than the derivative of a sine wave.

Figure 7:
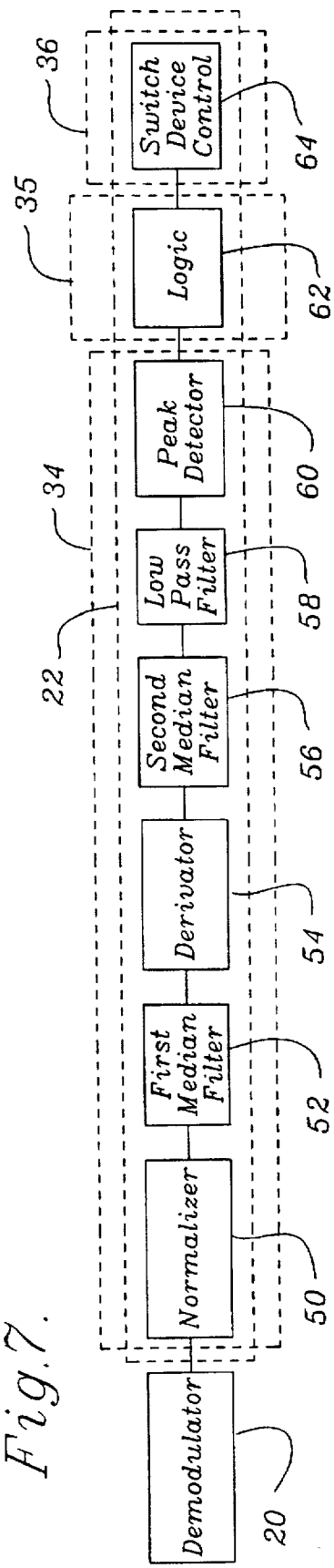
FIG. 7 is a functional block diagram of the false code monitor of the cab signaling apparatus.

One embodiment of the false code monitor 22 is shown in detail in FIG. 7. The false code monitor 22 preferably includes a cab signal conditioner 34 to condition the demodulated code signal received by such cab signaling apparatus to enable a false code to be differentiated from a proper cab signal code which corresponds to a proper cab signaling track signal aspect from the cab signal transmitter 3.

The cab signal conditioner 34 preferably includes a normalizer 50 which receives the output of the demodulator 20. The demodulator output is normalized enabling the false code monitor 22 to interpret signals having a variety of amplitudes in the same manner. In particular, the normalizer 50 may provide a moving window and within the moving window the voltage of the signal may be divided by the square root of the mean square voltage to provide a normalized output.

The cab signal conditioner 34 may additionally include a first median filter 52. The normalized output is preferably applied to a first median filter 52 to smooth the signal. The output of the first median filter 52 is the statistical median of a given number of samples (e.g. 21 samples). The use of the first median filter 52 herein may be advantageous inasmuch as rapid transitions in signal amplitude are preserved and the edges of the square wave may be used as the discriminator between a positive cab signal and a false code.

The output from the first median filter 52 may be applied to a derivator 54 within the cab signal conditioner 34 wherein the discrete derivative of the demodulated signal can be calculated. One method of calculating the discrete derivative includes subtracting the value of the envelope measured three samples previous to the value of the most recent sample. A three sample delay may be utilized to improve the discrimination between a true code and a false code.

The calculated discrete derivative may be applied to a second median filter 56 and a low-pass filter 58 within the cab signal conditioner 34. The second median filter 56 is preferably a fifteen sample median filter and the low-pass filter 58 is preferably a short time constant auto-regressive-moving average digital filter.

The second median filter 56 and the low-pass filter 58 help remove noise from the output of the derivator 54 while preserving features within the output such that false codes and true cab signal codes therein may be distinguished. The second median filter 56 removes noise but preserves edges within the waveform. The low-pass filter 58 removes spurious peaks which may remain in the output of the second median filter 56.

The output of the second median filter 56 may be applied to a peak detector 60. The peak detector 60 may be provided within the cab signal conditioner 34 to identify peaks within the derivative of the demodulated signal.

The output of the cab signal conditioner 34 may be applied to an analyzer 35. The analyzer 35 may include a first logic device, such as period and amplitude logic 62, to look for positive peaks and negative peaks within preselected ranges. The period and amplitude logic 62 may identify the signal as a candidate for a false code if the amplitude of the peaks fall within specified windows (e.g. the positive window may be from 0.015 to 0.05 and the negative window from −0.0083 to −0.046).

In addition, the period and amplitude logic 62 may monitor the periodicity of consecutive peaks. If a negative peak is identified, the period and amplitude logic 62 monitors the length of the time interval between the last two positive peaks and the amplitudes of these peaks. An analogous sequence of logic operations is performed for negative peaks when a positive peak is identified. A false code is identified if the time interval is appropriate for the code rates of interest and the amplitudes are within the pre-defined windows.

An interrupter 36 is preferably provided to prevent a false code from being applied to the decoder 26. The interrupter 36 may include a switch device control 64 for operating a first switch device 25 interposed between the demodulator 20 and the decoder 26. The period and amplitude logic 62 may operate the first switch device 25 via switch device control 64 in response to the false code requirements (amplitude and periodicity) being satisfied within the analyzer 35. The output from the demodulator 20 does not pass to the decoder 26 when the first switch device 25 is open. The first switch device 25 may be closed at all other times.

The output of the demodulator 20 is preferably applied to a limiter 24 and a digital to analog converter 68 when the first switch device 25 is closed. The limiter 24 ensures that the digital to analog converter 68 is not over-driven and the digital to analog converter 68 transforms the digitized demodulator output into an analog signal which may be read by the decoder 26.

It follows that the false code monitor 22 is preferably utilized to detect a false code within a code signal from a coded carrier (e.g. modulated 60 Hz signal) having a modulated envelope as previously discussed.

It is also desirable to include a track signal monitor 80 as shown in FIG. 8 to provide reliable cab signal processing when track signal aspects are merely indicated by the presence or absence of the carrier (e.g. 100Hz signal) and not by the modulation of the carrier (e.g. modulated 60 Hz signal). Specifically, the track signal monitor 80 identifies false indications which may arise when the fundamental frequency of the interference is approximately the same as (or overlaps) the carrier.

The track signal monitor 80 is shown in detail in FIG. 8. The track signal monitor 80 preferably includes a noise detector 82 to determine when the frequency of the noise component overlaps the frequency of the cab signal carrier. A preferred embodiment of the noise detector 82 may include a harmonic filter to detect higher harmonics (e.g. 500 Hz) of the interference as an indicator of when the frequency of interference overlaps the frequency of the cab signal carrier (e.g. 100 Hz). In particular, the harmonic filter can monitor the output of the track signal receiving coils 7, 8 which may be a first output signal which includes a primary cab signal component and a secondary noise component.

The first output signal from the track signal receiving coils 7, 8 may be applied to a bandpass filter 90 within the harmonic filter. The bandpass filter 90 preferably has a passband centered at a harmonic of the carrier frequency (e.g. 500 Hz for monitoring the 5th harmonic of a 100 Hz carrier). The output of the bandpass filter 90 may be converted to DC in a rectifier 92 and filtered in a low pass filter 94 within the harmonic filter.

The output of the noise detector 82 or harmonic filter is preferably high when the frequency of the secondary noise component overlaps the frequency of the cab signal carrier and low at all other times.

The track signal monitor 80 preferably includes a second switch device 88 which may be controlled by a logic device 86 and a second switch device control 85. Based upon the output of the noise detector 82, the logic device 86 may selectively apply, via the second switch device control 85 and second switch device 88, either the signal from the demodulator 20 to the decoder 26 or a substitute track signal from a track signal generator 87 to the decoder 26.

The logic device 86 may couple the output of the demodulator 20 to the decoder 26, via second switch device control 85 and second switch device 88, for normal operation when the output of the noise detector 82 is low (thereby indicating that the fundamental frequency of the secondary noise component and the frequency of the cab signal carrier are not overlapping).

Alternatively, the logic device 86 may couple a track signal generator 87 within the track signal monitor 80 to the decoder 26 via second switch device 88 when the noise detector 82 is high (thereby indicating that the fundamental frequency of the secondary noise component and the frequency of the cab signal carrier are overlapping).

A track signal generator 87 may preferably be utilized to generate a substitute track signal to approximate the demodulated output when a cab signal is present inasmuch as the adaptive filter 18 attenuates the cab signal and interference when the frequency of the interference (secondary noise component) and the frequency of the cab signal carrier (primary cab signal component) overlap.

In addition, the logic device 86 preferably continuously monitors the output of the demodulator 20. The logic device 86 may thereby determine whether a cab signal was present at the moment when the output of the noise detector 82 changes from low to high.

Accordingly, the logic device 86 may instruct the track signal generator 87 to generate a substitute track signal for application to the decoder 26, via the limiter 24 and digital to analog converter 68, if the demodulator output 20 was high when the noise detector 82 changed from low to high. The application of the substitute track signal to the decoder 26 via the second switch device 88 avoids a false restrictive signal which would otherwise result from the attenuation of the cab signal within the adaptive filter 18.

Alternatively, the logic device 86 may instruct the track signal generator 87 to not generate a substitute track signal if the output of the demodulator 20 is low when the noise detector 82 goes from low to high. The absence of a substitute track signal from the track signal generator 87 corresponds to the absence of a track signal.

The logic device 86 may additionally monitor the phase of the attenuated residual signal from the adaptive filter 18 when the output of the noise detector 82 is high. The track signal monitor 80 monitors the phase of the residual signal in order to determine whether the cab signal status changes while the frequencies of the interference and carrier overlap.

In particular, the residual signal from the adaptive filter 18 may be filtered in bandpass filter 44b at the appropriate carrier frequency (e.g., 100 Hz) and applied to a phase detector 84 which calculates the phase of the signal as a function of time of the input. The phase information may be subsequently applied to the logic device 86 within the track signal monitor 80 as shown in FIG. 8.

The logic device 86 may preferably detect a rapid in change in phase of the residual signal corresponding to a change in the status of the cab signal. The rapid change in phase will indicate a change in the status of the cab signal corresponding to either a sudden loss of cab signal or the sudden presence of a cab signal.

The attenuated residual signal of the adaptive filter 18 is a composite wave including a noise signal component and a track signal component when the interference and cab signal carrier overlap. Accordingly, the phase of the residual signal is a combination of the phase of the noise signal and the track signal. Therefore, the phase of the attenuated residual signal from the adaptive filter will change once the status of the track signal component changes (i.e. appears or is removed). This change in phase may be detected within the logic device 86.

Alternatively, the logic device 86 may establish a reference phase which corresponds to the residual signal from the adaptive filter 18 when the frequency of the secondary noise component and the frequency of the primary cab signal component overlap. The logic device 86 may subsequently detect a change in the status of the track signal component by detecting a deviation of the phase of the residual signal from the reference phase.

The logic device 86 may change the operation of the track signal generator 87 in response to the detection of a change in phase within the residual signal corresponding to a change in status of the track signal. In particular, the track signal generator 87 will cease to generate a substitute track signal if a rapid change in phase is detected while the track signal generator 87 is generating a signal. Alternatively, the track signal generator 87 may begin to generate a DC level which indicates the presence of a cab signal if a rapid change in phase is detected while the track signal generator 87 is not generating a DC level.

The logic device 86 controls the second switch device 88, via second switch device control 85, to couple the output of the demodulator 20 to the decoder 26 in response to a change in the noise detector 82 from high to low. The cab signaling apparatus may thereafter resume operation as previously described.

The decoder 26 may be a Decoder Model No. N451910-0104 currently manufactured by Union Switch and Signal Inc. of Pittsburgh, Pa. The decoder 26 receives the demodulated output when the first switch device is closed and processes the cab signal therein. The decoder 26 may interface with a train control 70. The train control 70 may include a processor and/or hardware to control a LED display to indicate the proper track signal aspect, an audio alarm to indicate a change to a more restrictive cab signal aspect, and the brakes of the train if a penalty application is required.

Figure 9:
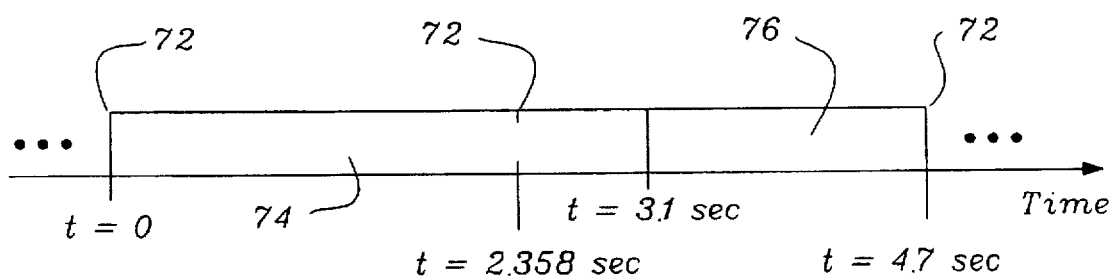
FIG. 9 is a timing diagram of the track signal processing and test signal processing and reset functions.

The decoder 26 may perform additional functions of test and reset to confirm the proper operation of the digital signal processor 16 and ensure vital operation. Referring to FIG. 9, the cab signal apparatus in accordance with the present invention may process cab signals from the cab signal transmitter 3 during fixed cab signal processing periods 74. Additionally, the cab signal apparatus may undergo a self test during a test signal processing period 76.

The decoder 26 sends out test control commands at a given rate (e.g. at 3.1 seconds and every 4.7 seconds thereafter) to function generators 66 as shown in the timing diagram in FIG. 9. The function generator 66, in response to the control command signal, generates an input signal which is digitized in the analog to digital converter 41 and filtered in high pass filter 42. The input signal may be subsequently applied to one of the preprocessing module 14 and the adaptive filter 18. The decoder 26 interprets the results after the input signals from the function generators 66 have propagated through the adaptive filter 18. In particular, the decoder 26 confirms that the adaptive filter 18 is performing its intended function.

A variety of components may be tested by the decoder 26. In particular, low pass filters 40 may be tested to insure that the low pass filters 40 remove the first two components that alias to 100 Hz and 60 Hz for a sampling rate of 1200 Hz and that the track signal receiving coils 7, 8 and noise coils 9, 10 within the signal receiver 12 may be shunted. In particular, the signal receiver 12 components may be shunted and a Noise Null may be applied via line 33 to the predictor 29 and a 1100 Hz and 1400 Hz sinusoidal signal may be applied via line 30 to the signal channel (within the preprocessing module 14, if present, or directly to the adaptive filter 18) and the output of the demodulator 20 may be monitored to perform the testing of the low pass filters 40 and shunting of the signal receiver 12 components.

The test may also verify that the function generator 66 can be engaged, that the Noise Null signal disables adaptation, and that demodulation is being conducted appropriately. In particular, the signal receiver 12 components are shunted and a Noise Null is asserted. A signal, such as a 60 Hz and 100 Hz sinusoid, may be applied to the signal channel and a desired level at the decoder 26 may be detected.

The false code monitor 22 functionality may also be monitored. The signal receiver 12 components may be shunted and a Noise Null asserted and a signal, such as a 60 Hz and 63 Hz signal, may be applied to the signal channel. The demodulator 20 may thereafter be monitored for the opening of a first switch device 25.

An open circuit within the signal receiver 12 components may be detected by shunting each of the components, asserting a Noise Null, enabling (disabling) high-side (low-side) signal channel or noise channel input from the function generator 66, applying a 100 Hz sinusoid signal to the signal channel or noise channel and monitoring the output of the demodulator 20.

The signal receiver 12 components may be shunted and all function generator 66 inputs disabled and the input of the decoder 26 may be monitored to test disabling of the test signals.

The adaptive filter 18 and the preprocessing module 14 may be tested by shunting the signal receiver 12 components, de-asserting the Noise Null, and applying a sinusoidal signal to the noise channels and simultaneously monitoring the output of the demodulator 20 for expected transients.

The decoder 26 may additionally perform a reset function 72 wherein the adaptive filter 18 is reset to an initial state after a given period of time (i.e. every 2.358 seconds). The timing of the reset function 72 is shown in FIG. 9. The reset function 72 is desired because the adaptive filter 18 may learn to cancel the desired cab signal over time if there is cross coupling of the cab signal on the noise reference. This permits the learned error to be periodically collapsed.

The output of the demodulator 20 may also be monitored for a transient due to the reset function. This test verifies that a reset of the adaptive filter 18 occurs at the end of the test sequence.

The function of the signal receiver 12, and track signal receiving coils 7, 8 and noise coils 9, 10 therein, is temporarily suspended while such testing and reset functions are performed.

While preferred embodiments of the invention have been shown and described herein, it will be appreciated by those skilled in the art that various modifications and alternatives to the disclosed embodiments may be developed in light of the overall teachings of the disclosure. Accordingly, the disclosed embodiments are meant to be illustrative only and not limiting to the scope of the invention which is to be given the full breadth of the following claims and all equivalents thereof.

We claim:

1. A cab signal apparatus for use on board a railway vehicle propelled on a set of spaced rails by a traction motor and such propelled vehicle including a first input device generating a first output signal with a primary cab signal component and a secondary noise component and a second input device generating a second output signal with a secondary cab signal component and a primary noise component, such cab signal apparatus comprising:

a. an adaptive filter connected to receive such signals from such first input device and such second input device;

b. said adaptive filter receiving such first output signal and such second output signal and operating to cancel such secondary noise component from such first output signal; and c. a demodulator connected to said adaptive filter for receiving such first output signal and retrieving a code signal from such primary cab signal component thereof, and such code signal including cab signal aspects for assisting with the operation of such railway vehicle.

2. The cab signaling apparatus of claim 1 further comprising a false code monitor coupled with said demodulator for distinguishing a false code from such code signal and preventing such false code from passing through such cab signal apparatus.

3. The cab signaling apparatus of claim 2 wherein said false code monitor analyzes the rate of change of such code signal.

4. The cab signaling apparatus of claim 1 further comprising a track signal monitor coupled with said demodulator for identifying the presence of a false cab signal component within such first output signal.

5. The cab signaling apparatus of claim 2 further comprising a track signal monitor coupled with said demodulator for identifying the presence of a false cab signal component within such first output signal.

6. The cab signaling apparatus of claim 1 further comprising a decoder connected to said demodulator and said decoder generates a track aspect signal corresponding to such code signal received from said demodulator.

7. The cab signaling apparatus of claim 6 wherein said decoder periodically resets said adaptive filter.

8. The cab signaling apparatus of claim 6 further comprising a false code monitor coupled with said demodulator and said decoder and said false code monitor for distinguishing a false code from such code signal and preventing such false code from passing through such cab signaling apparatus.

9. The cab signaling apparatus of claim 6 further comprising a track signal monitor coupled with said demodulator and said decoder for identifying the presence of a false cab signal component within such first output signal.

10. The cab signaling apparatus of claim 8 further comprising a track signal monitor coupled with said demodulator and said decoder for identifying the presence of a false cab signal component within such first output signal.

11. The cab signaling apparatus of claim 1 wherein said adaptive filter is a recursive least squares filter.

12. The cab signaling apparatus of claim 1 wherein said adaptive filter is a direct form recursive least squares filter.

13. The cab signaling apparatus of claim 1 wherein said adaptive filter is a recursive least squares lattice-ladder filter.

14. The cab signaling apparatus of claim 1 wherein said adaptive filter operates to continuously vary its spectrum characteristic to cancel such secondary noise component generated by such railway vehicle and whereby said cab signaling apparatus is self tuning to such railway vehicle.

15. The cab signaling apparatus of claim 1 further comprising a precancellation module connected to such first input device and such second input device and said adaptive filter; and said precancellation module cancels such secondary noise component within such first output signal and a secondary cab signal component within such second output signal.

16. The cab signaling apparatus of claim 15 further comprising a false code monitor coupled with said demodulator for distinguishing a false code from such code signal and preventing such false code from passing through such cab signaling apparatus.

17. The cab signaling apparatus of claim 16 wherein said false code monitor analyzes the rate of change of such code signal.

18. The cab signaling apparatus of claim 15 further comprising a track signal monitor coupled with said demodulator to identify the presence of a false cab signal component within such first output signal.

19. The cab signaling apparatus of claim 16 further comprising a track signal monitor coupled with said demodulator to identify the presence of a false cab signal component within such first output signal.

20. The cab signaling apparatus of claim 15 further comprising a decoder connected to said demodulator and said decoder generates a track aspect signal corresponding to such code signal received from said demodulator.

21. The cab signaling apparatus of claim 20 wherein said decoder periodically resets said adaptive filter.

22. The cab signaling apparatus of claim 20 further comprising a false code monitor coupled with said demodulator and said decoder and said false code monitor for distinguishing a false code from such code signal and preventing such false code from passing through such cab signaling apparatus.

23. The cab signaling apparatus of claim 20 further comprising a track signal monitor coupled with said demodulator and said decoder and said track signal monitor to identify the presence of a false cab signal component within such first output signal.

24. The cab signaling apparatus of claim 22 further comprising a track signal monitor coupled with said demodulator and said decoder and said track signal monitor to identify the presence of a false cab signal component within such first output signal.

25. The cab signaling apparatus of claim 15 wherein said adaptive filter is a recursive least squares filter.

26. The cab signaling apparatus of claim 15 wherein said adaptive filter is a direct form recursive least squares filter.

27. The cab signaling apparatus of claim 15 wherein said adaptive filter is a recursive least squares lattice-ladder filter.

28. The cab signaling apparatus of claim 15 wherein said adaptive filter operates to continuously vary its spectrum characteristic to cancel such secondary noise component generated by such railway vehicle and whereby said cab signaling apparatus is self tuning to such railway vehicle.

29. A false code monitor for use within a cab signaling apparatus being utilized within a railway vehicle to receive a code signal from a track signal transmitted through a set of spaced rails and such false code monitor for identifying a false code within such code signal, such false code monitor comprising:

a. a signal conditioner to modify such code signal received by such cab signaling apparatus to differentiate such false code from a cab signal code;

b. an analyzer to detect such false code within such code signal;

c. an interrupter to discard such code signal in response to the detection of such false code therein;

d. said signal conditioner having a normalizer to receive such code signal and establish a reference for analyzing such code signal;

e. said signal conditioner having a derivator connected to said normalizer to calculate a derivative of such code signal; and f. said signal conditioner having a peak detector connected to said derivator to identify peaks which correspond to given rates of change within such code signal.

30. The false code monitor of claim 29 wherein said analyzer includes a first logic device to compare such peaks with characteristics of such false code.

31. The false code monitor of claim 30 wherein said first logic device monitors the amplitude and periodicity of such peaks.

32. The false code monitor of claim 29 further comprising a median filter interposed between said derivator and said peak detector to remove noise within such code signal.

33. The false code monitor of claim 29 further comprising a switch device control coupled with said first logic device to open a first switch device interposed between an input device and a train control within such cab signaling apparatus in response to the identification of such false code.

34. The false code monitor of claim 33 further comprising a median filter interposed between said derivator and said peak detector to remove noise within such code signal.

35. A method of reducing noise within a cab signal transmitted from a wayside cab signal transmitter to a railway vehicle via a set of spaced rails, the method comprising the steps of:
   a. receiving a modulated signal and a noise signal and wherein such modulated signal and such noise signal each include a cab signal component and a noise component;
   b. reducing such noise component within such modulated signal;
   c. reducing such cab signal component within such noise signal;
   d. canceling such noise component within said modulated signal;
   e. demodulating such modulated signal to generate a code signal; and
   f. decoding such code signal to obtain a track signal aspect therefrom.

36. The method of claim 35 wherein a preprocessing module reduces such noise component within such modulated signal and reduces such cab signal component within such noise signal.

37. The method of claim 36 wherein an adaptive filter cancels such noise component within such modulated signal.

38. The method of claim 35 wherein an adaptive filter cancels such noise component within such modulated signal.

39. The method of claim 35 further comprising the following steps before step f: differentiating a false code from such code signal; and discarding such false code.

40. The method of claim 39 wherein a preprocessing module reduces such noise component within such modulated signal and reduces such cab signal component within such noise signal.

41. The method of claim 40 wherein an adaptive filter cancels such noise component within such modulated signal.

42. The method of claim 39 wherein an adaptive filter cancels such noise component within such modulated signal.

43. The method of claim 39 wherein a false code monitor differentiates such false code from such code signal.

44. The method of claim 39 wherein a track signal monitor differentiates such false code from such code signal.

45. The method of claim 41 wherein one of a false code monitor and a track signal monitor differentiates such false code from such code signal.

46. A track signal monitor for use within a cab signaling apparatus being utilized within a railway vehicle to receive a track signal transmitted through a set of spaced rails and such track signal monitor for identifying such track signal within a first output signal which includes a track signal component and a noise component, such track signal monitor comprising:
   a. a noise detector to monitor such noise component of such first output signal;
   b. a track signal generator coupled to such noise detector to create a substitute track signal in response to the frequency of such noise component overlapping such track signal component;
   c. a phase detector to monitor the phase of a residual signal derived from such first output signal; and
   d. a logic device coupled to said phase detector to remove such substitute cab signal in response to a change in the phase of such residual signal.

47. The track signal monitor of claim 46 wherein such noise detector includes a harmonic filter for determining when the frequency of such noise component overlaps such track signal component within such first output signal.

48. The track signal monitor of claim 46 wherein said logic device detects changes in the phase of such residual signal.

49. The track signal monitor of claim 46 wherein said logic device detects a phase deviation between such residual signal and a reference signal.

50. The track signal monitor of claim 46 further comprising a switch device coupled with said logic device and said switch device selectively couples such track signal generator with a decoder utilized to derive a track signal aspect from such track signal.

51. The track signal monitor of claim 46 wherein such first output signal is adaptively filtered to create such residual signal.

52. A method of processing a first output signal including a primary cab signal component and a secondary noise signal component and such primary cab signal component being transmitted from a wayside transmitter to a railway vehicle via a set of spaced rails, the method comprising the steps of:
   a. monitoring the frequency of such noise signal component;
   b. generating a substitute track signal in response to the frequency of such noise signal component overlapping the frequency of such primary cab signal component and the presence of such primary cab signal component within such first output signal;
   c. monitoring the phase of a residual signal derived from such first output signal;
   d. detecting a change in the phase of such residual signal corresponding to a change in a track signal aspect; and
   e. removing such substitute track signal in response to a change in the phase of such residual signal.

53. The method of claim 52 further comprising the step before step c. of establishing a reference phase for comparing the phase of such residual signal thereto.

54. The method of claim 52 wherein such phase of such residual signal rapidly changes in response to a change in such track signal aspect.

55. The method of claim 52 further comprising a step before step a. of filtering such first output signal to permit detection of a harmonic of such noise component.

* * * * *